US011150165B2

(12) United States Patent
Shetty et al.

(10) Patent No.: US 11,150,165 B2
(45) Date of Patent: Oct. 19, 2021

(54) SYSTEM AND METHOD FOR CONFIGURATION DRIFT DETECTION AND REMEDIATION

(71) Applicant: Dell Products, L.P., Round Rock, TX (US)

(72) Inventors: Sudhir Vittal Shetty, Cedar Park, TX (US); Rakesh Kumar Ayolasomyajula, Georgetown, TX (US); Pushkala Iyer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 304 days.

(21) Appl. No.: 16/290,553

(22) Filed: Mar. 1, 2019

(65) Prior Publication Data
US 2020/0278274 A1  Sep. 3, 2020

(51) Int. Cl.
*H04L 12/26* (2006.01)
*G01M 99/00* (2011.01)
(Continued)

(52) U.S. Cl.
CPC ....... *G01M 99/005* (2013.01); *G06F 11/3051* (2013.01); *G06F 11/3055* (2013.01);
(Continued)

(58) Field of Classification Search
None
See application file for complete search history.

(56) References Cited

U.S. PATENT DOCUMENTS

| 2003/0210235 A1* | 11/2003 | Roberts ................. G06F 3/0414 345/173 |
| 2008/0071939 A1 | 3/2008 | Tanaka et al. |

(Continued)

FOREIGN PATENT DOCUMENTS

CA  2471013 A1 * 7/2003 .......... G06F 11/3055

OTHER PUBLICATIONS

International Search Authority (ISA), "International Search Report," International Application No. PCT/US2020/020625, dated Jun. 10, 2020, 2 pages, publisher Commissioner for Patents—PCT, Alexandria, Virginia, United States of America.
(Continued)

*Primary Examiner* — Phuongchau Ba Nguyen
(74) *Attorney, Agent, or Firm* — Fogarty LLP

(57) ABSTRACT

Administration of IHSs (Information Handling Systems) within a data center results gradual drift of the configuration parameters of the individual IHSs such that the IHSs may no longer be in compliance with data center policies, such as policies in support of security and disaster recovery procedures. Embodiments provide techniques for distributed determination of drift within a network of managed IHSs, in which each managed IHS is provided with baselines for the configuration parameters utilized by each managed IHS. Using the provided baselines, each managed IHS identifies discrepancies between its current configuration and the applicable baselines. Based on discrepancies reported by the managed IHSs, a management console evaluates drift within the network of managed IHSs and determines when to trigger remediation procedures in order to correct the drift.

16 Claims, 3 Drawing Sheets

(51) Int. Cl.
  *G06F 11/30*   (2006.01)
  *H04L 12/24*   (2006.01)
  *G06F 11/07*   (2006.01)
(52) U.S. Cl.
  CPC .......... *G06F 11/0703* (2013.01); *H04L 41/08* (2013.01); *H04L 43/0823* (2013.01)

(56) References Cited

U.S. PATENT DOCUMENTS

| | | | |
|---|---|---|---|
| 2010/0045467 A1* | 2/2010 | Sachanandani | A61B 5/02455 340/573.1 |
| 2010/0058157 A1* | 3/2010 | Kelly | G06Q 20/202 714/819 |
| 2010/0082518 A1 | 4/2010 | Gaffga et al. | |
| 2013/0013753 A1 | 1/2013 | Zessin et al. | |
| 2013/0116578 A1* | 5/2013 | An | A61B 5/4842 600/484 |
| 2016/0173510 A1* | 6/2016 | Harris | H04L 63/02 726/23 |

OTHER PUBLICATIONS

International Search Authority (ISA), "Written Opinion of the International Searching Authority," International Application No. PCT/US2020/020625, dated Jun. 10, 2020, 6 pages, publisher Commissioner for Patents—PCT, Alexandria, Virginia, United States of America.

\* cited by examiner

SYSTEM AND METHOD FOR CONFIGURATION DRIFT DETECTION AND REMEDIATION

FIELD

This disclosure relates generally to Information Handling Systems (IHSs), and more specifically, to management of IHS configuration parameters.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade server that are stacked and installed within racks. A data center may include large numbers of such server racks that are organized into rows. Administration of such large groups of IHSs may require teams of remote and local administrators working in shifts in order to support availability of the data center operations while minimizing downtime. Such data center administration commonly involves administrators implementing ad hoc repairs that are focused towards addressing an identified issue. In administering large groups of IHSs in this manner, the individual IHSs in a data center may gradually become configured such that they do not conform to various data center policies. For instance, non-uniform adherence to disaster recovery policies within a data center may render the disaster recovery capabilities of the data center ineffective, or even inoperable.

SUMMARY

In various embodiments, a method is provided for monitoring drift of configuration parameters of a plurality of IHSs (Information Handling Systems). The method includes: generating a plurality of baselines of configuration parameters for each of the plurality of IHSs; transmitting one or more of the baselines to each of the plurality of IHSs; evaluating, by each of the plurality of IHSs, a current configuration of a respective IHS against baselines received by the respective IHS; detecting, by each of the plurality of IHSs, a discrepancy between the current configuration of a respective IHS from one or more of the baselines received by the respective IHS; reporting, by each of the plurality of IHS, the detected discrepancies; and determining a drift in the configuration parameters of the plurality of IHSs based on the reported discrepancies.

In additional method embodiments, the plurality of baselines is generated by a management console operable to monitor the drift of configuration parameters of the plurality of IHSs. In additional method embodiments, the drift is determined by the management console based on the discrepancies reported by each of the plurality of IHSs. In additional method embodiments, the plurality of baselines comprise a discrepancy threshold, and wherein the detected discrepancies are reported if the detected discrepancies exceed the discrepancy threshold. In additional method embodiments, a first baseline of the plurality of baselines comprises a first partial baseline corresponding to a first set of configuration parameters of a first IHS and further comprises a second partial baseline corresponding to a second set of configuration parameters of the first IHS. In additional method embodiments, the first partial baseline comprises a first discrepancy threshold, and wherein discrepancies detected between the first set of configuration parameters and the current configuration of the first IHS are reported if the detected discrepancies in the first set of configuration parameters exceed the first discrepancy threshold, and wherein second partial baseline comprises a second discrepancy threshold, and wherein discrepancies detected between the second set of configuration parameters and the current configuration of the first IHS are reported if the detected discrepancies in the second set of configuration parameters exceed the second discrepancy threshold. In additional method embodiments, the one or more baselines are transmitted to a remote access controller of each of the plurality of IHSs. In additional method embodiments, the remote access controller evaluates the current configuration of each of the plurality of IHSs against the one or more baselines.

In various additional embodiments, a system monitors drift of configuration parameters of a plurality of IHSs (Information Handling Systems). The system includes a management console operable to monitor the drift of configuration parameters of the plurality of IHSs, wherein the management console is configured to: generate a plurality of baselines of configuration parameters for each of the plurality of IHSs; transmit one or more of the baselines to each of the plurality of IHSs; and determine a drift in the configuration parameters of the plurality of IHSs based on discrepancies reported by each of the plurality of IHSs. The system also includes the plurality of Information Handling Systems (IHSs) wherein each of the plurality of IHSs is configured to: evaluate a current configuration of a respective IHS against baselines received by the respective IHS; detect a discrepancy between the current configuration of the respective IHS from one or more of the baselines received by the respective IHS; and report the detected discrepancies.

In additional system embodiments, the plurality of baselines comprise a discrepancy threshold, and wherein the detected discrepancies are reported if the detected discrepancies exceed the discrepancy threshold. In additional system embodiments, a first baseline of the plurality of baselines comprises a first partial baseline corresponding to a first set of configuration parameters of a first IHS and further comprises a second partial baseline corresponding to a second set of configuration parameters of the first IHS. In additional system embodiments, the first partial baseline comprises a first discrepancy threshold, and wherein discrepancies detected between the first set of configuration parameters and the current configuration of the first IHS are reported if the detected discrepancies in the first set of configuration parameters exceed the first discrepancy threshold, and wherein second partial baseline comprises a second discrepancy threshold, and wherein discrepancies detected between the second set of configuration parameters and the current configuration of the first IHS are reported if the detected discrepancies in the second set of configuration parameters exceed the second discrepancy threshold. In additional system embodiments, the one or more baselines are transmitted to a remote access controller of each of the plurality of IHSs. In additional system embodiments, the remote access controller evaluates the current configuration of each of the plurality of IHSs against the one or more baselines.

In various additional embodiments, an IHS operates within a network of IHSs. The IHS includes: one or more processors operable to execute instructions for running software applications configured according to a first set of configuration parameters; a plurality of hardware components configured according to a second set of configuration parameters; a remote access controller configured to communicate with a remote management console for monitoring drift of the first set and the second set of configuration parameters of the IHS, wherein the remote access controller is configured to: receive a plurality of baselines comprising baselines for the first set of configuration parameters and baselines for the second set of configuration parameters; detect a plurality of software configuration discrepancies between a current configuration of the software applications and one or more of the baselines provided for the first set of configuration parameters; detect a plurality of hardware configuration discrepancies between a current configuration of the hardware components and one or more of the baselines provided for the second set of configuration parameters; and report the detected software configuration discrepancies and the detected hardware configuration discrepancies to a management console that utilizes the reported discrepancies in determining a drift in the configuration parameters of the network of IHSs.

In additional IHS embodiments, the baselines for the first set of configuration parameters comprise a first discrepancy threshold, and wherein the baselines for the second set of configuration parameters comprise a second discrepancy threshold. In additional IHS embodiments, the software configuration discrepancies are reported if the software configuration discrepancies exceed the first discrepancy threshold, and wherein the hardware component discrepancies are reported if the hardware configuration discrepancies exceed the first discrepancy threshold. In additional IHS embodiments, the management console utilizes the reported discrepancies in determining a first drift in the software configurations of the network of IHSs and in determining a second drift in the hardware configurations of the network of IHSs. In additional IHS embodiments, the remote access controller determines the current configuration of the hardware components via a sideband signaling pathway between the remote access controller and each of the hardware components. In additional IHS embodiments, the remote access controller determines the current configuration of the software applications via the operating system of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
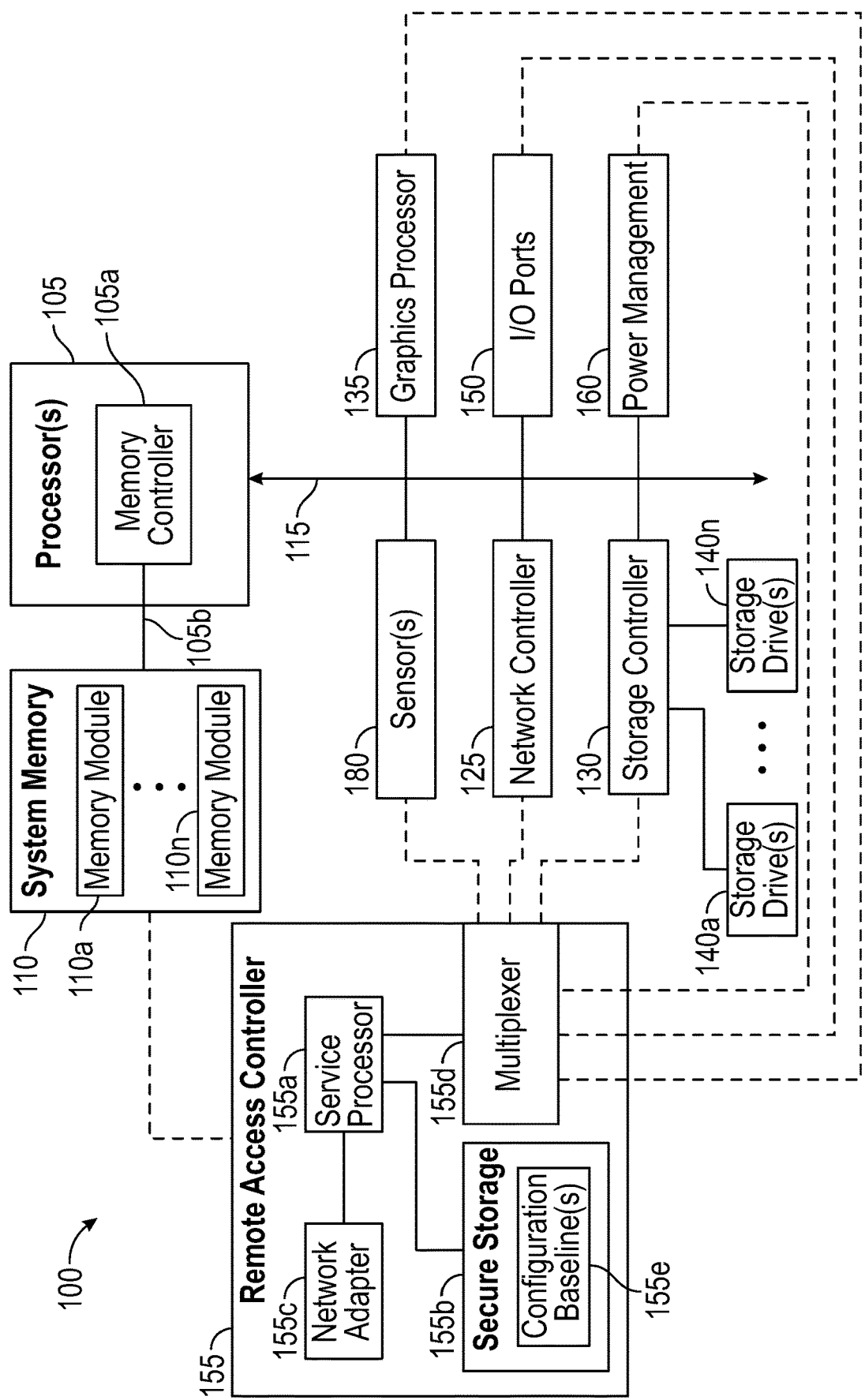
FIG. 1 is a block diagram depicting certain components of an IHS configured according to various embodiments for detecting and remediating drift of configuration parameters of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise computing device, other embodiments may be utilized.

As described, administration of IHSs within a data center environment may result in gradual drift of the configuration parameters of the individual IHSs such that the IHSs may no longer be in compliance with data center policies, such as policies in support of security and disaster recovery procedures. Detecting such drift may be accomplished by comparing the current configuration of each IHS against a baseline of configuration parameters of each managed IHS. In existing systems for detecting configuration drift, a central management process has access to stored configuration baselines for each of the managed IHSs. The central management process queries each managed IHS in order to retrieve the current configuration of the IHS and compares the retrieved configuration against the baseline stored for each managed IHS. As described, data centers may include large numbers of IHSs, each of which may have a large number of configuration parameters. Accordingly, existing drift detection implemented by a central management process consumes significant bandwidth and results in a slow and expensive operation that scales poorly. In light of such shortcomings of existing systems, embodiments provide techniques for distributed determination of drift within a network of managed IHSs, in which each managed IHS identifies discrepancies between its current configuration and applicable baselines of configuration parameters. Based on discrepancies reported by the managed IHSs, a central management console evaluates the drift within the network of managed IHSs and determines when to trigger remediation procedures in order to correct the drift.

FIG. 1 is a block diagram illustrating certain components of an IHS 100 configured according to certain embodiments to implement systems and methods described herein, in particular for detecting and remediating drift of configuration parameters of the IHS 100. In certain data center embodiments, a rack-mounted chassis may include one or more bays that each receive an individual sled (that may be additionally or alternatively referred to as a tray, blade, and/or node), such as compute sleds that provides processing resources and storage sleds that provide storage resources. In certain embodiments, IHS 100 may be a compute sled installed within rack-mounted chassis that is housed within a data center. Although the embodiment of FIG. 1 describes an IHS in the form of a compute sled or other computing component that may be deployed within a bay of a rack-mounted chassis, other embodiments may be implemented using other types of IHSs.

In embodiments where IHS 100 is a compute sled installed within a chassis that is stacked within a rack along with other chassis that also include various sleds, IHS 100 may utilize certain shared power, network and cooling resources provided by the chassis and/or rack. In certain embodiments, various aspects of such shared capabilities by IHS 100 may be configurable. As described in more detail below, in such scenarios, parameters used for such configurations may be monitored for drift through the operation of IHS 100 and a management console used to monitor IHS 100 and other IHSs within a data center, or within another distributed network of managed IHSs.

In certain embodiments, IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications. In certain embodiments, various aspects of the operation of processors 105 may be configurable. For instance, the clock speed of processors 105 may be configurable in order to limit the heat that is generated or configured based on agreements with parties that have contracted for use of the processing resources of IHS 100. In such instances, the parameters used for controlling such configurations of IHS 100 may be monitored for drift.

As illustrated, processor(s) 105 includes an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 100 via a high-speed memory interface 105b. The system memory 110 may be coupled to processor(s) 105 via a memory bus 105b that provides the processor(s) 105 with high-speed memory used in the execution of computer program instructions by the processor(s) 105. Accordingly, system memory 110 may include memory components, such as such as static RAM (SRAM), dynamic RAM (DRAM), NAND Flash memory, suitable for supporting high-speed memory operations by the processor(s) 105. In certain embodiments, system memory 110 may combine both persistent, non-volatile memory and volatile memory. In certain embodiments, various aspects of the operation of memory controller 105a may be configurable. For instance, the speed of memory access supported by memory controller 105a or the memory modules available for use by memory controller 105a may be configurable. In such instances, the parameters used for controlling such configuration of memory controller 105a may be monitored for drift.

In certain embodiments, the system memory 110 may be comprised of multiple removable memory modules. The system memory 110 of the illustrated embodiment includes removable memory modules 110a-n. Each of the removable memory modules 110a-n may correspond to a printed circuit board memory socket that receives a removable memory module 110a-n, such as a DIMM (Dual In-line Memory Module), that can be coupled to the socket and then decoupled from the socket as needed, such as to upgrade memory capabilities or to replace faulty components. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset that may be implemented by integrated circuits that are connected to each processor 105. All or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways served by bus 115. In certain embodiments, bus 115 may include a PCIe (PCI Express) switch fabric that is accessed via a PCIe root complex. IHS 100 may also include one or more I/O ports 150, such as PCIe ports, that may be used to couple the IHS 100 directly to other IHSs, storage resources or other peripheral components. In certain embodiments, I/O ports 150 may be enabled and disabled, such as enabling of a debug port supported by IHS 100. In addition, various security restrictions on the use of I/O ports 150 may be similarly enabled and disabled. In such instances, the parameters used for such configuration of I/O ports 150 may be monitored for drift.

As illustrated, a variety of resources may be coupled to the processor(s) 105 of the IHS 100 via bus 115. For instance, processor(s) 105 may be coupled to a network controller 125, such as provided by a Network Interface Controller (NIC) that is coupled to the IHS 100 and allows the IHS 100 to communicate via an external network, such as the Internet or a LAN. In certain embodiments, various aspects of the operation of network controller 125 may be configurable. For instance, network controller 125 may be configured to implement security protocols that restrict certain types of network traffic, such as limiting access to certain ports, limiting connections to certain IP addresses, or limiting non-TCP/IP (Transmission Control Protocol/Internet Protocol) network requests. In such instances, the parameters used for configuration of network controller 125 may be monitored for drift.

Processor(s) 105 may also be coupled to a power management unit 160 that may interface with a power system of a chassis in which an IHS 100 may be installed as a compute sled. In certain embodiments, various aspects of the operation of power management unit 160 may be configurable and the parameters used for configuration of the power management unit 160 may be monitored for drift. In certain embodiments, a graphics processor 135 may be comprised within one or more video or graphics cards, or an embedded controller, installed as components of the IHS 100. In certain embodiments, graphics processor 135 may be an integrated in the remote access controller 155 and may be utilized to support the display of diagnostic and administrative interfaces related to IHS 100, via display devices that are coupled, either directly or remotely, to remote access controller 155. In certain embodiments, various aspects of the operation of remote access controller 155 may be configurable and the parameters used for configuration of the remote access controller 155 may be monitored for drift. In certain embodiments, the remote access controller 155 and/or the operating system of IHS 100 may utilize information collected by various sensors 180 located within the IHS. For instance, temperature data collected by sensors 180 may be utilized by the remote access controller 155 in support of closed-loop airflow cooling of the IHS 100. In certain embodiments, various aspects of the operation of such sensors 180 may be configurable and the parameters used for configuration of the remote access controller 155 may be monitored for drift.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 155.

In certain embodiments, remote access controller 155 may operate from a different power plane from the processors 105 and other components of IHS 100, thus allowing the remote access controller 155 to operate, and management tasks to proceed, while the processing cores of IHS 100 are powered off. As described, various functions provided by the BIOS, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

As illustrated, remote access controller 155 may include a service processor 155a, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In support of remote monitoring functions, network adapter 125c may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality used by information technology (IT) administrators to deploy, update, monitor, and maintain servers remotely.

In some embodiments, remote access controller 155 may support monitoring and administration of various managed devices 110, 125, 130, 135, 150, 160, 180 of an IHS via a sideband bus interface. For instance, messages utilized in drift detection and remediation may be transmitted using I2C sideband bus connections that may be established with each of the respective managed devices 110, 125, 130, 135, 150, 160, 180 through the operation of a multiplexer 155d of the remote access controller 155. As illustrated, the managed devices 110, 125, 130, 135, 150, 160, 180 of IHS 100 may also be coupled to the IHS processor(s) 105 via an in-line bus 115, such as a PCIe root complex, that is separate from the sideband bus connections used for device management. In certain embodiments, the remote access controller 155 may establish such in-line bus 115 connections via the operating system of the IHS 100. In such embodiments, remote access controller 155 may query the operating system of IHS 100 via the processor 105 or chipset of the IHS.

As illustrated, in certain embodiments, the remote access controller 155 may include a secure storage 155b that may be implemented via a memory device that is isolated from the operating system of IHS 100. As described in additional detail with regard to the embodiments of FIGS. 2 and 3, the remote access controller 155 may receive configuration baselines from a management console that detects configuration drift within a managed network of IHSs, such as IHS 100. Configuration baselines received from the management console may be stored to the secure storage 155b. These storage configuration baselines 155e may be utilized by the remote access controller 155 in order to identify any discrepancies between the current configuration of the IHS 100 and the stored configuration baselines 155e.

For instance, remote access controller 155 may periodically query managed components 110, 125, 130, 135, 150, 160, 180 in order to determine the current configuration of these hardware components of IHS 100. In certain embodiments, such queries may be implemented via the illustrated sideband signaling pathways between the remote access controller 155 and each of the managed components 110, 125, 130, 135, 150, 160, 180. Additionally or alternatively, the remote access controller 155 may determine the current configuration of the managed components 110, 125, 130, 135, 150, 160, 180 via queries supported by the operating system of IHS 100. Remote access controller 155 may also periodically determine the current configuration of various software applications installed on IHS 100, including the operating system of IHS 100. In certain embodiments, remote access controller 155 may determine the current configuration of software applications of IHS 100 through queries supported by the operating system of IHS 100, such as lookups of the registry settings IHS 100.

Remote access controller 155 may compare the current configurations of the software and hardware of IHS 100 against the configuration baselines 155e received from the management console. Upon detecting discrepancies between the current configuration of the IHS 100 and the configuration baselines 155e, the remote access controller may be configured to generate reports notifying management console of the identified discrepancies. As described in additional detail with regard to FIG. 3, in certain embodiments, remote access controller 155 may only generate such reports if the detected discrepancies are greater than a discrepancy threshold that may be specified as part of each of the configuration baselines 155e. In certain embodiments, different configuration baselines 155e received from the management console may pertain to different capabilities and resources of IHS 100, with each of the different configuration baselines 155e may specify a different discrepancy threshold. In this manner, certain configuration baselines 155e may be specified with low discrepancy thresholds for issuing notifications, such as baselines pertaining to security features of IHS 100, while other configuration baselines 155e may be specified with higher discrepancy thresholds for issuing notifications, such as baselines pertaining to infrequently used software applications.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
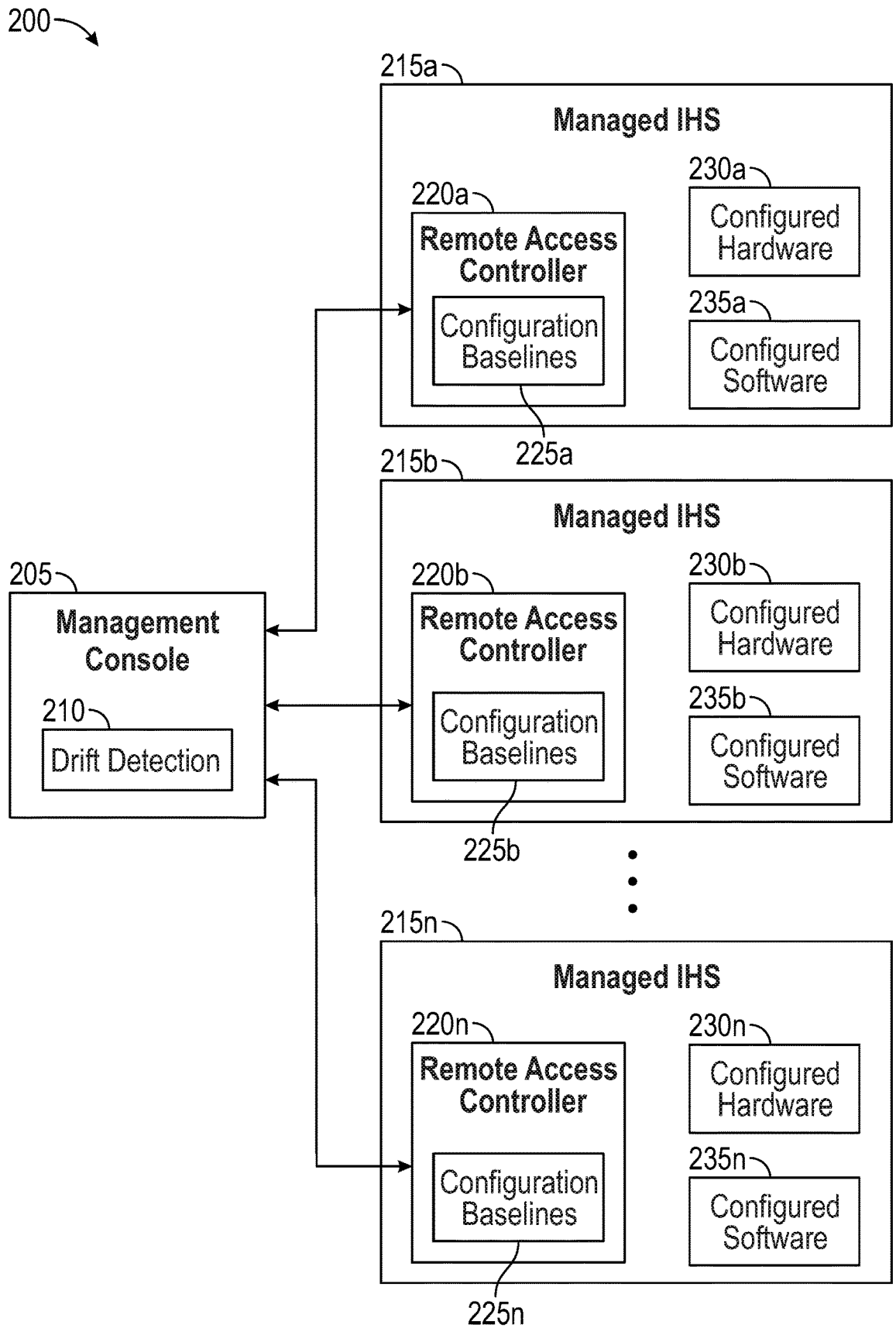
FIG. 2 is a block diagram depicting certain components of a system configured according to various embodiments for detecting and remediating drift of configuration parameters of a plurality of IHSs.

FIG. 2 is a block diagram depicting certain components of a system 200 that may be configured for detecting and remediating drift of configuration parameters of a plurality of managed IHSs 215a-n. As described with regard to FIG. 1, a managed IHS, such a blade server utilized within a data center, may include a remote access controller 220a-n by which various aspects of managed IHSs 215a-n may be remotely monitored and administered. In certain embodiments, the remote access controllers 220a-n of managed IHS 215a-n may communicate with a management console 205 in detecting and remediating configuration drift in the managed IHSs 215a-n. As described, the operations of remote access controllers 220a-n may be external to the operating system of a managed IHS 215a-n, thus allowing configuration drift to be managed and remediated without the operating system of IHS 215a-n.

As described, the distributed detection of configuration drift within a network of managed IHSs 215a-n may utilize a management console 205 that is configured to determine baselines for the configuration parameters of the managed IHSs 215a-n. In certain instances, each of the managed IHSs 215a-n may include identical, or nearly identical, hardware and software such that each of the managed IHSs 215a-n may be configured identically. In such instances, management console 205 may generate a single baseline of configuration parameters for each of the managed IHSs 215a-n. In other instances, managed IHSs 215a-n may vary with respect to their respective installed hardware and software, and in certain instance may operate based on contractual agreements that limit the hardware and software resources that may be utilized by an individual managed IHS 215a-n. In such instances, management console 205 may generate different baselines for each of the managed IHSs 215a-n.

Figure 3:
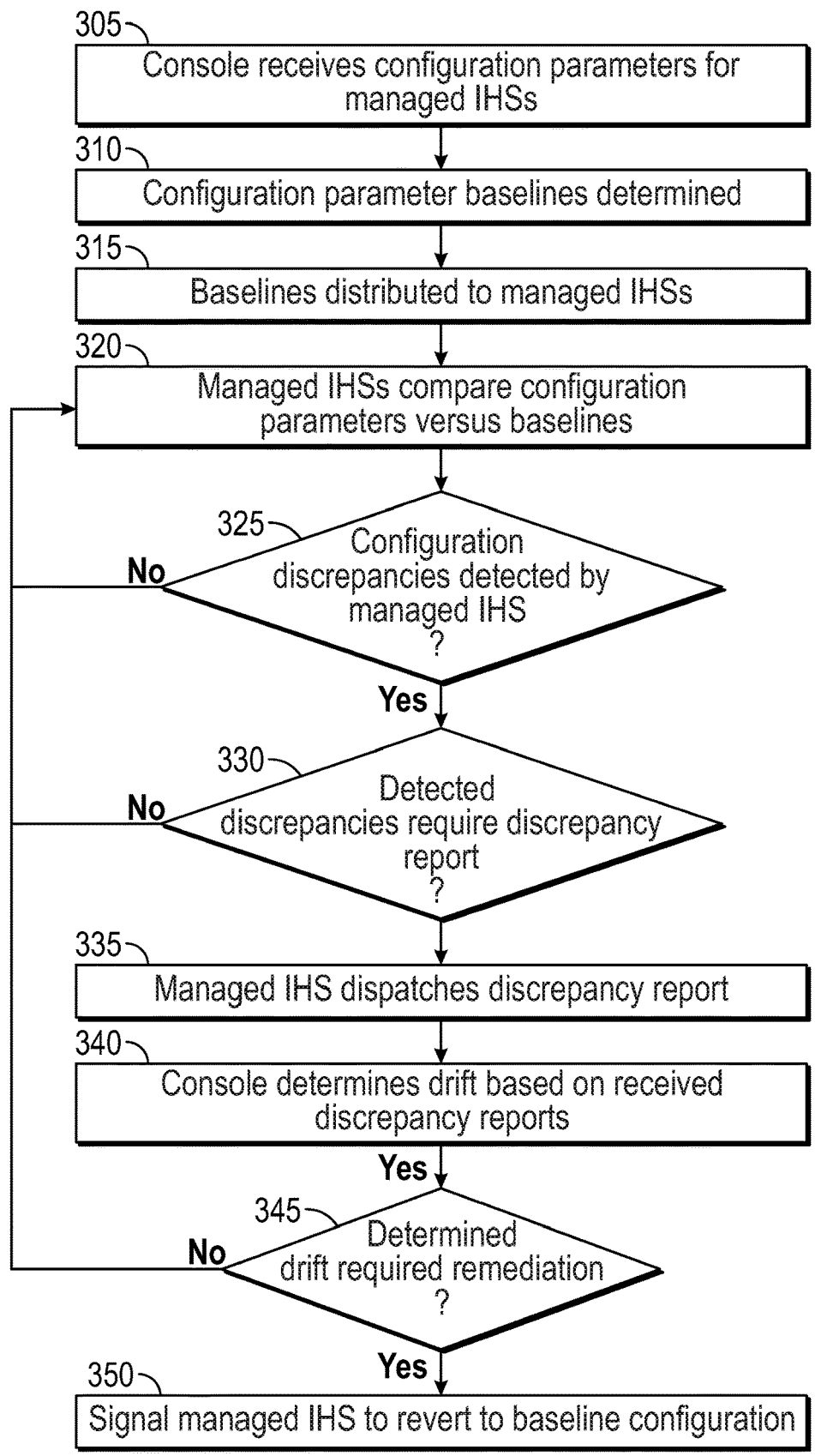
FIG. 3 is a flow chart illustrating certain steps of a process according to certain embodiments for detecting and remediating drift of configuration parameters of a plurality of IHSs.

As described in additional detail with regard to FIG. 3, in certain embodiments, the management console may generate various different baselines that may each be dedicated to a group of related configuration parameters. For instance, management console 205 may generate a baseline of configuration parameters that relate to security of the managed IHSs 215a-n, or to a particular aspect of security such as network security settings. In other instances, management console 205 may generate a baseline of configuration parameters that relate to physical input and output ports, such as debug and USB ports that may be enabled and disabled on a blade server type IHS. In other instances, management console 205 may generate a baseline of configuration parameters that relate to a particular type of component, such as a type of storage controller installed in some or all of the managed IHSs 215a-n, or to a specific aspect of a type of component, such as the firmware in use by a type of storage controller. Such baselines are provided as illustrative examples and various other types of configuration parameter baselines may be utilized by embodiments. As described in additional detail with regard to FIG. 3, each such baseline may include a threshold that specifies the number and/or type of deviations from the baseline that trigger a notification to the management console 205 by the managed IHSs 215a-n detecting discrepancies from the baseline.

The baselines generated by management console 205 are transmitted to each of the managed IHSs 215a-n. Such baselines may be received by the remote access controllers 220a-n of each of the managed IHSs 215a-n and stored to a storage area 225a-n of each respective remote access controller 220a-n. Using the stored configuration baselines 225a-n, each of the remote access controllers 220a-n may periodically, or based on a signal from the management console 205, identify any discrepancies in the configuration of a managed IHS 215a-n from one of the stored configuration baselines 225a-n. As described with regard to FIG. 1, the remote access controllers 220a-n may utilize sideband signal pathways for managing one or more of the hardware components 230a-n that have been installed and configured for operation in a managed IHS 215a-n. Also as described, remote access controllers 220a-n may utilize in-band communication pathways for managing one or more software applications 235a-n that are installed and configured for operation in a managed IHS 215a-n.

In certain embodiments, the baselines generated by management controller 205 may include baselines that include configuration parameters for hardware components 230a-n that are configured via sideband connections established by remote access controllers 220a-n. In such embodiments, other baselines generated by management controller 205 may include baselines that include configuration parameters for software applications 235a-n that are configured via in-band connections. Using these two types of baselines, hardware configurations managed directly by the remote access controllers 220a-n may be separately managed from software applications that are managed via the operating system of a managed IHS 215a-n.

FIG. 3 illustrates certain steps of a process according to certain embodiments for detecting and remediating drift of configuration parameters utilized by a network of managed IHSs, such as within a data center. The illustrated embodiment begins at block 305 with the receipt of configuration parameters for the managed IHSs. In certain embodiments, each managed IHS may be configured to report its configuration parameters in response to a query from the management console that may be issued upon detecting a new or reconfigured IHS within the network of managed IHSs. In other embodiments, the configuration parameters for use by a managed IHS may be generated using the management console, or another administrative application used to configure and deployed IHSs within the network of managed IHSs.

Based on the configuration parameters of the managed IHSs, at block 310, the management console may determine one or more baselines for the configuration parameters. In certain scenarios, the management console may define a separate baseline each managed IHS. In other scenarios, a separate baseline may be defined for groups of IHSs that include identical or similar hardware and software profiles.

In other scenarios, separate baselines may be defined for groups of managed IHSs that are similarly tasked, such as a group of managed IHSs that support e-commerce functions for the same organization. As described, in certain scenarios, a baseline of configuration parameters may be limited to a specific category of configuration parameters, such as a baseline of the networking, storage or security configuration parameters being utilized by one or more of the managed IHSs. In other scenarios, a baseline may include combination of different such categories of configuration parameters, but that are all required to adhere to a specific policy, such as a disaster recovery policy.

Once a baseline has been determined by the management console, at block 315, the baselines may be distributed to some or all of the managed IHSs. As described with regard to FIGS. 1 and 2, the management console may be configured to communicate with a remote access controller of each managed IHS. Via such a connection with a remote access controller of a managed IHS, the management console may transmit one or more applicable baselines to each of the managed IHSs. In addition to specifying a baseline of configuration parameters, in certain embodiments, baselines may specify the types and number of discrepancies for which a managed IHS should notify the management console. As described in additional detail below, such configuration of alerts may specify different notification thresholds for different baselines.

As described above, the baselines received by a managed IHS may be stored by a remote access controller of managed IHS. At block 320, the managed IHS may compare the current configuration parameters of the managed IHS against one or more of the baselines stored by the remote access controller. In certain embodiments, the remote access controller of a managed IHS may be configured to periodically make such checks for configuration discrepancies from one or more baselines. In other embodiments, the remote access controller may be configured to initiate such discrepancy determinations in response to detecting one or more modifications to the configuration parameters of the managed IHS. As described, the remote access controller may determine a current configuration of an IHS or an aspect of an IHS via in-band and/or sideband communications. Identifying discrepancies from certain baselines may require only sideband communications, such as discrepancies related to certain hardware configurations of components managed by the remote access controller. Other baselines may require only in-band communication, such as discrepancies related to software applications that run in the operating system of the IHS.

Based on the current configuration of the IHS, at block 325, the managed IHS determines whether there any discrepancies in configuration from one or more of the baselines transmitted to the IHS by the management console. As described, over time, the configuration of an IHS may be modified by administrators in ad hoc repairs required to address issues that may include emergency repairs that result in one or more IHSs becoming non-compliant with data center policies. In addition, configuration changes may result from the operation of software applications run by the IHS, including software applications controlled and/or deployed by malicious actors, and by inadvertent errors in manual and automated configuration of the IHS. As described, in certain embodiments, the remote access controller of a managed IHS may be configured to determine whether the configuration of the managed IHS has changed relative to one or more baselines distributed by the management console. If no discrepancies from the baselines are detected, the operations of the managed IHS may revert to block 320 and remain dormant until the next evaluation of the configuration parameters, that may be periodic or triggered by a detected modification to a configuration parameter.

If any discrepancies are detected by the managed IHS, at block 330, the managed IHS determines whether the detected discrepancies require the managed IHS to issue a notification to the management console. As described, a managed IHS may be provided with information specifying thresholds for the types and number of configuration discrepancies to be reported to management console. Also as described, each baseline may include its own threshold, such that even a single discrepancy from certain baselines may trigger a notification, while thresholds for other baselines may specify larger tolerances for issuing a notification. For instance, in certain scenarios, baselines associated with critical security parameters may be associated with a low threshold that instructs a notification to be issued by a managed IHS upon detecting any discrepancies. Conversely, baselines associated with configuration of less critical systems, such as configuration of a graphics processor or storage drives, may be associated with a threshold that only requires notification after multiple discrepancies have been identified.

If discrepancies from a baseline are identified that exceed a threshold associated with that baseline, at block 335, the managed IHS issues a notification report to the managed console. As described with respect to FIG. 2, the managed console receives such notification reports from each of the managed IHSs based on each managed IHS evaluating its configuration against the baselines provided by the managed console. Based on such discrepancy reports received from each of the managed IHSs, at block 340, the management console determines the amount of configuration drift with the managed IHSs.

As with the baselines distributed to the individual managed IHSs, the management console may utilize thresholds for evaluating the drift from a baseline by the managed IHSs. For instance, configurations of managed IHSs from a baseline pertaining to configuration of temperature sensors may be allowed to vary significantly before signaling a drift condition since there is no imperative rationale requiring the cooling systems of the managed IHSs to always operate uniformly. Since cooling requirements may vary within a datacenter, such drift may even be expected with regard to the configuration of cooling system components. On the other hand, the management console may signal drift from a baseline upon detecting a small number managed IHSs with discrepancies that result in non-compliance with a disaster recovery policy.

At block 345, the management console determines whether the detected drift warrants remediation. In certain embodiments, this determination may be based on the number of IHSs that have reported discrepancies from a baseline and/or based on the number of discrepancies reported by the managed IHSs. For instance, if the management console receives discrepancy reports indicating that a certain percentage of the managed IHSs are no longer configured in conformance with a particular baseline, the management console may determine that the detected drift requires remediation. If remediation is determined to the required by the management console based on the detected drift from a baseline, at block 350, the management console may issue signals to the managed IHSs reporting discrepancies from a baseline to revert their configurations to that baseline. In this manner, the management console may rely on the individual managed IHSs to detect configuration discrepancies while maintaining the configuration of managed IHSs within certain ranges, while still allowing for some deviations within the configuration of the managed IHSs.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for monitoring drift of configuration parameters of a plurality of IHSs (Information Handling Systems), the method comprising:

generating a plurality of baselines of configuration parameters for each of the plurality of IHSs;

transmitting one or more of the baselines to each of the plurality of IHSs;

evaluating, by each of the plurality of IHSs, a current configuration of a respective IHS against baselines received by the respective IHS, wherein a first baseline of the plurality of baselines comprises a first partial baseline corresponding to a first set of configuration parameters of a first IHS and further comprises a second partial baseline corresponding to a second set of configuration parameters of the first IHS;

detecting, by each of the plurality of IHSs, a discrepancy between the current configuration of a respective IHS from one or more of the baselines received by the respective IHS;

reporting, by each of the plurality of IHS, the detected discrepancies, wherein the plurality of baselines comprise a discrepancy threshold, and wherein the detected discrepancies are reported if the detected discrepancies exceed the discrepancy threshold; and determining a drift in the configuration parameters of the plurality of IHSs based on the reported discrepancies.

2. The method of claim 1, the plurality of baselines is generated by a management console operable to monitor the drift of configuration parameters of the plurality of IHSs.

3. The method of claim 2, wherein the drift is determined by the management console based on the discrepancies reported by each of the plurality of IHSs.

4. The method of claim 1, wherein the first partial baseline comprises a first discrepancy threshold, and wherein discrepancies detected between the first set of configuration parameters and the current configuration of the first IHS are reported if the detected discrepancies in the first set of configuration parameters exceed the first discrepancy threshold, and wherein second partial baseline comprises a second discrepancy threshold, and wherein discrepancies detected between the second set of configuration parameters and the current configuration of the first IHS are reported if the detected discrepancies in the second set of configuration parameters exceed the second discrepancy threshold.

5. The method of claim 1, wherein the one or more baselines are transmitted to a remote access controller of each of the plurality of IHSs.

6. The method of claim 5, wherein the remote access controller evaluates the current configuration of each of the plurality of IHSs against the one or more baselines.

7. A system for monitoring drift of configuration parameters of a plurality of IHSs (Information Handling Systems), the system comprising:

a management console operable to monitor the drift of configuration parameters of the plurality of IHSs, wherein the management console is configured to:

generate a plurality of baselines of configuration parameters for each of the plurality of IHSs;

transmit one or more of the baselines to each of the plurality of IHSs; and determine a drift in the configuration parameters of the plurality of IHSs based on discrepancies reported by each of the plurality of IHSs; and the plurality of Information Handling Systems (IHSs) wherein each of the plurality of IHSs is configured to:

evaluate a current configuration of a respective IHS against baselines received by the respective IHS, wherein a first baseline of the plurality of baselines comprises a first partial baseline corresponding to a first set of configuration parameters of a first IHS and further comprises a second partial baseline corresponding to a second set of configuration parameters of the first IHS;

detect a discrepancy between the current configuration of the respective IHS from one or more of the baselines received by the respective IHS; and report the detected discrepancies, wherein the plurality of baselines comprise a discrepancy threshold, and wherein the detected discrepancies are reported if the detected discrepancies exceed the discrepancy threshold.

8. The system of claim 7, wherein the first partial baseline comprises a first discrepancy threshold, and wherein discrepancies detected between the first set of configuration parameters and the current configuration of the first IHS are reported if the detected discrepancies in the first set of configuration parameters exceed the first discrepancy threshold, and wherein second partial baseline comprises a second discrepancy threshold, and wherein discrepancies detected between the second set of configuration parameters and the current configuration of the first IHS are reported if the detected discrepancies in the second set of configuration parameters exceed the second discrepancy threshold.

9. The system of claim 7, wherein the one or more baselines are transmitted to a remote access controller of each of the plurality of IHSs.

10. The system of claim 9, wherein the remote access controller evaluates the current configuration of each of the plurality of IHSs against the one or more baselines.

11. An IHS (Information Handling System) operating within a network of IHSs, wherein the IHS comprises:

one or more processors operable to execute instructions for running software applications configured according to a first set of configuration parameters;

a plurality of hardware components configured according to a second set of configuration parameters;

a remote access controller configured to communicate with a remote management console for monitoring drift of the first set and the second set of configuration parameters of the IHS, wherein the remote access controller is configured to:

receive a plurality of baselines comprising baselines for the first set of configuration parameters and baselines for the second set of configuration parameters;

detect a plurality of software configuration discrepancies between a current configuration of the software applications and one or more of the baselines provided for the first set of configuration parameters;

detect a plurality of hardware configuration discrepancies between a current configuration of the hardware components and one or more of the baselines provided for the second set of configuration parameters; and report the detected software configuration discrepancies and the detected hardware configuration discrepancies to a management console that utilizes the reported discrepancies in determining a drift in the configuration parameters of the network of IHSs.

12. The IHS of claim 11, wherein the baselines for the first set of configuration parameters comprise a first discrepancy threshold, and wherein the baselines for the second set of configuration parameters comprise a second discrepancy threshold.

13. The IHS of claim 12, wherein the software configuration discrepancies are reported if the software configuration discrepancies exceed the first discrepancy threshold, and wherein the hardware component discrepancies are reported if the hardware configuration discrepancies exceed the first discrepancy threshold.

14. The IHS of claim 11, wherein the management console utilizes the reported discrepancies in determining a first drift in the software configurations of the network of IHSs and in determining a second drift in the hardware configurations of the network of IHSs.

15. The IHS of claim 11, wherein the remote access controller determines the current configuration of the hardware components via a sideband signaling pathway between the remote access controller and each of the hardware components.

16. The IHS of claim 15, wherein the remote access controller determines the current configuration of the software applications via the operating system of the IHS.

* * * * *